US008427004B2

(12) United States Patent
Kitanaka

(10) Patent No.: US 8,427,004 B2
(45) Date of Patent: Apr. 23, 2013

(54) ELECTRIC-VEHICLE CONTROLLER AND POWER STORAGE UNIT SHUTOFF SWITCH

(75) Inventor: Hidetoshi Kitanaka, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 349 days.

(21) Appl. No.: 12/295,154

(22) PCT Filed: Jul. 20, 2006

(86) PCT No.: PCT/JP2006/314402
§ 371 (c)(1), (2), (4) Date: Sep. 29, 2008

(87) PCT Pub. No.: WO2008/010281
PCT Pub. Date: Jan. 24, 2008

(65) Prior Publication Data

US 2009/0267412 A1 Oct. 29, 2009

(51) Int. Cl.
*H02H 7/18* (2006.01)

(52) U.S. Cl.
USPC ............ 307/10.7; 307/9.1; 307/10.1; 701/19; 701/22

(58) Field of Classification Search .................. 307/10.7
See application file for complete search history.

(56) References Cited

U.S. PATENT DOCUMENTS 4,745,997 A * 5/1988 Takei et al. ..................... 191/87
4,893,691 A * 1/1990 Park ............................. 180/169
4,955,304 A * 9/1990 Spenk et al. .................. 104/296
4,990,886 A * 2/1991 Stanulis ........................ 340/467
5,389,824 A 2/1995 Moroto et al.
5,577,569 A 11/1996 Nakashima
5,651,434 A * 7/1997 Saunders .......................... 191/2
5,757,150 A 5/1998 Kinoshita et al.
5,818,673 A * 10/1998 Matsumaru et al. ............ 361/63
5,896,283 A * 4/1999 Usami ............................ 363/98
5,941,608 A * 8/1999 Campau et al. ............ 303/113.4
(Continued)

FOREIGN PATENT DOCUMENTS

EP 1 603 224 A1 12/2005
GB 2 265 240 9/1993
(Continued)

OTHER PUBLICATIONS

JP Pg-pub 2006/20450 to Shimamoto—english translation, Jan. 19, 2006.*

(Continued)

*Primary Examiner* — Rexford Barnie
*Assistant Examiner* — Justen Fauth
(74) *Attorney, Agent, or Firm* — Buchanan Ingersoll & Rooney PC

(57) ABSTRACT

There is obtained an electric-vehicle controller that prevents energy stored in a power storage unit from being discharged in the case where a collision, a derailment, or breakage of an overhead line occurs. The electric-vehicle controller is provided with a DC-to-DC converter one terminal pair of which is connected to the DC power source side of the inverter, a power storage unit that is connected to the other terminal pair of the DC-to-DC converter and stores electric power, a switch provided between the power storage unit and the DC-to-DC converter, and a control unit that opens the switch in the case where abnormal circumstances may occur or have occurred.

14 Claims, 5 Drawing Sheets

U.S. PATENT DOCUMENTS

| | | | | |
|---|---|---|---|---|
| 6,046,553 | A * | 4/2000 | Matsunaga et al. | 318/139 |
| 6,088,635 | A * | 7/2000 | Cox et al. | 701/19 |
| 6,175,511 | B1 * | 1/2001 | Ooba | 363/37 |
| 6,243,245 | B1 * | 6/2001 | Totsuka et al. | 361/103 |
| 2002/0177929 | A1 * | 11/2002 | Kumar | 701/19 |
| 2004/0143382 | A1 * | 7/2004 | Ishida | 701/36 |
| 2004/0201362 | A1 * | 10/2004 | Borrego Bel et al. | 320/104 |
| 2005/0231171 | A1 * | 10/2005 | Kato et al. | 320/166 |

FOREIGN PATENT DOCUMENTS

| | | | |
|---|---|---|---|
| JP | 2-106101 | A | 4/1990 |
| JP | 3-293928 | A | 12/1991 |
| JP | 5-236602 | A | 9/1993 |
| JP | 6-046502 | A | 2/1994 |
| JP | 7-059202 | A | 3/1995 |
| JP | 7-111703 | A | 4/1995 |
| JP | 2003-199203 | A | 7/2003 |
| JP | 2003-199204 | A | 7/2003 |
| JP | 2004-274945 | A | 9/2004 |
| JP | 2006-020450 | A | 1/2006 |
| JP | 2006-055000 | A | 2/2006 |

OTHER PUBLICATIONS

JP Pg-pub 2006/55000 to Nakasawa et al.—english translation, Feb. 23, 2006.*

Form PCT/ISA/210 (International Search Report) dated Oct. 3, 2006.

Canadian Office Action, dated Sep. 27, 2012, for Canadian App. No. 2,653,165 (3 pages).

* cited by examiner

MOTOR
POWER STORAGE UNIT
INVERTER
DC/DC CONVERTER
CONVERTER
CONTROL UNIT
ACCELERATION SENSOR
ES
0A
EMERGENCY BRAKE STATUS SIGNAL EB
AUXILIARY BRAKE (DIRECT BACKUP BRAKE) STATUS SIGNAL HB
PANTOGRAPH LOWERING SIGNAL PD
DIRECTION SWITCH NEUTRAL POSITION SIGNAL N
VEHICLE SPEED V
VEHICLE SPEED DETECTOR
DRIVER'S PLATFORM
1
2
3
4
5
10
11
12
13
14
15
16
17
18
20

MOTOR
12
10
11
INVERTER
14
POWER STORAGE UNIT
15
16
ES
DC/DC CONVERTER
13
CONTROL UNIT
OA
ACCELERATION SENSOR
17
CONVERTER
20
AC GENERATOR
30
EMERGENCY BRAKE STATUS SIGNAL EB
AUXILIARY BRAKE (DIRECT BACKUP BRAKE) STATUS SIGNAL HB
DIRECTION SWITCH NEUTRAL POSITION SIGNAL N
VEHICLE SPEED V
VEHICLE SPEED DETECTOR
18
5
DRIVER'S PLATFORM

12
MOTOR
10
11
INVERTER
POWER STORAGE UNIT
15
14
ES
16
CONTROL UNIT
OA
ACCELERATION SENSOR
17
DC/DC CONVERTER
13
DC/DC CONVERTER
40
50
DC GENERATOR
EMERGENCY BRAKE STATUS SIGNAL EB
AUXILIARY BRAKE (DIRECT BACKUP BRAKE) STATUS SIGNAL HB
DIRECTION SWITCH NEUTRAL POSITION SIGNAL N
VEHICLE SPEED V
VEHICLE SPEED DETECTOR
18
5
DRIVER'S PLATFORM

ELECTRIC-VEHICLE CONTROLLER AND POWER STORAGE UNIT SHUTOFF SWITCH

TECHNICAL FIELD

The present invention relates to an electric-vehicle controller equipped with a power storage unit in which DC power is charged and from which DC power is discharged.

BACKGROUND ART

To date, it has been known that the kinetic energy of the vehicle can effectively be utilized, by mounting in an electric vehicle an electric-controller in which a power storage unit is integrated with an inverter that drives a motor of the electric vehicle, storing in the power storage unit superfluous regenerative electric power produced when the vehicle is braked, and utilizing the stored power when the vehicle is accelerated or when an overhead line voltage is lowered (e.g., Patent Document 1). In addition, the power storage unit is formed of a power storage device such as a secondary battery, an electric double-layer capacitor, or the like.

In order to obtain electric power that is large enough to drive an electric vehicle, the electric power accumulated in the power storage unit mounted in such an electric-vehicle controller configured as described above becomes a large quantity ranging from several KWh to several hundreds KWh. Accordingly, the power storage unit is required to store large energy, and the electric vehicle travels with such large energy stored. Therefore, there has been a problem that, in the case where an external factor such as a collision exerts external force or impact on the electric-vehicle controller and the inner circuit of the electric-vehicle controller is damaged, the energy stored in the power storage unit is discharged, whereby a great deal of heat or electromagnetic force further damages the electric-vehicle controller and the electric vehicle.

[Patent Document 1] Japanese Patent Application Laid-Open No. 2003-199204

DISCLOSURE OF THE INVENTION

The present invention has been implemented in order to solve the foregoing problem; the objective thereof is to provide an electric-vehicle controller that prevents energy stored in a power storage unit from being discharged in the case where an external factor, such as a collision, a derailment, or breakage of an overhead line, in abnormal circumstances has exerted or may exert external force or a collision on the electric-vehicle controller (i.e., the main body).

In an electric-vehicle controller, according to the present invention, provided with an inverter that is connected to a DC power source and drives a motor, a DC-to-DC converter one terminal pair of which is connected to the DC power source side of the inverter, and a power storage unit that is connected to the other terminal pair of the DC-to-DC converter and stores electric power, there are provided a switch disposed between the power storage unit and the DC-to-DC converter and a control unit that opens the switch so as to separate the power storage unit from the DC-to-DC converter, in the case where an emergency brake status signal for an electric vehicle is inputted thereto and the emergency brake status signal for an electric vehicle is generated.

Moreover, in an electric-vehicle controller, according to the present invention, provided with an inverter that is connected to a DC power source and drives a motor, a DC-to-DC converter one terminal pair of which is connected to the DC power source side of the inverter, and a power storage unit that is connected to the other terminal pair of the DC-to-DC converter and stores electric power, there are provided a switch disposed between the power storage unit and the DC-to-DC converter and a control unit that opens the switch so as to separate the power storage unit from the DC-to-DC converter, in the case where an auxiliary brake status signal or a direct backup brake status signal for an electric vehicle is inputted thereto and the auxiliary brake status signal or the direct backup brake status signal for an electric vehicle is generated.

Still moreover, in an electric-vehicle controller, according to the present invention, provided with an inverter that is connected to a DC power source and drives a motor, a DC-to-DC converter one terminal pair of which is connected to the DC power source side of the inverter, and a power storage unit that is connected to the other terminal pair of the DC-to-DC converter and stores electric power, there are provided a switch disposed between the power storage unit and the DC-to-DC converter and a control unit that opens the switch so as to separate the power storage unit from the DC-to-DC converter, in the case where a pantograph lowering signal for an electric vehicle is inputted thereto and the pantograph lowering signal for an electric vehicle is generated.

Furthermore, in an electric-vehicle controller, according to the present invention, provided with an inverter that is connected to a DC power source and drives a motor, a DC-to-DC converter one terminal pair of which is connected to the DC power source side of the inverter, and a power storage unit that is connected to the other terminal pair of the DC-to-DC converter and stores electric power, there are provided a switch disposed between the power storage unit and the DC-to-DC converter and a control unit that opens the switch so as to separate the power storage unit from the DC-to-DC converter, in the case where a neutral position signal for an electric-vehicle direction switch is inputted thereto and the neutral position signal for an electric-vehicle direction switch is generated.

In an electric-vehicle controller according to the present invention, in the case where an abnormal circumstance has occurred or in the case where it is anticipated that an abnormal circumstance occurs, energy stored in a power storage unit is prevented from being discharged; therefore, heat or the like can be prevented from damaging the electric-vehicle controller or an electric vehicle.

DESCRIPTION OF SYMBOLS

1. OVERHEAD LINE
2. PANTOGRAPH
3. WHEEL
4. RAIL
5. DRIVER'S PLATFORM
10. ELECTRIC-VEHICLE CONTROLLER

11. INVERTER
12. MOTOR
13. DC-TO-DC CONVERTER
14. SWITCH
15. POWER STORAGE UNIT
16. CONTROL UNIT
16A. LOGIC SUM CIRCUIT
16B. COMPARISON CIRCUIT
16C. LOGIC MULTIPLICATION CIRCUIT
16D. COMPARISON CIRCUIT
16E. LOGIC SUM CIRCUIT
17. ACCELERATION SENSOR
18. VEHICLE SPEED DETECTOR
20. CONVERTER
30. AC GENERATOR
40. DC-TO-DC CONVERTER
50. DC GENERATOR

BEST MODE FOR CARRYING OUT THE INVENTION

Embodiment 1

Figure 1:
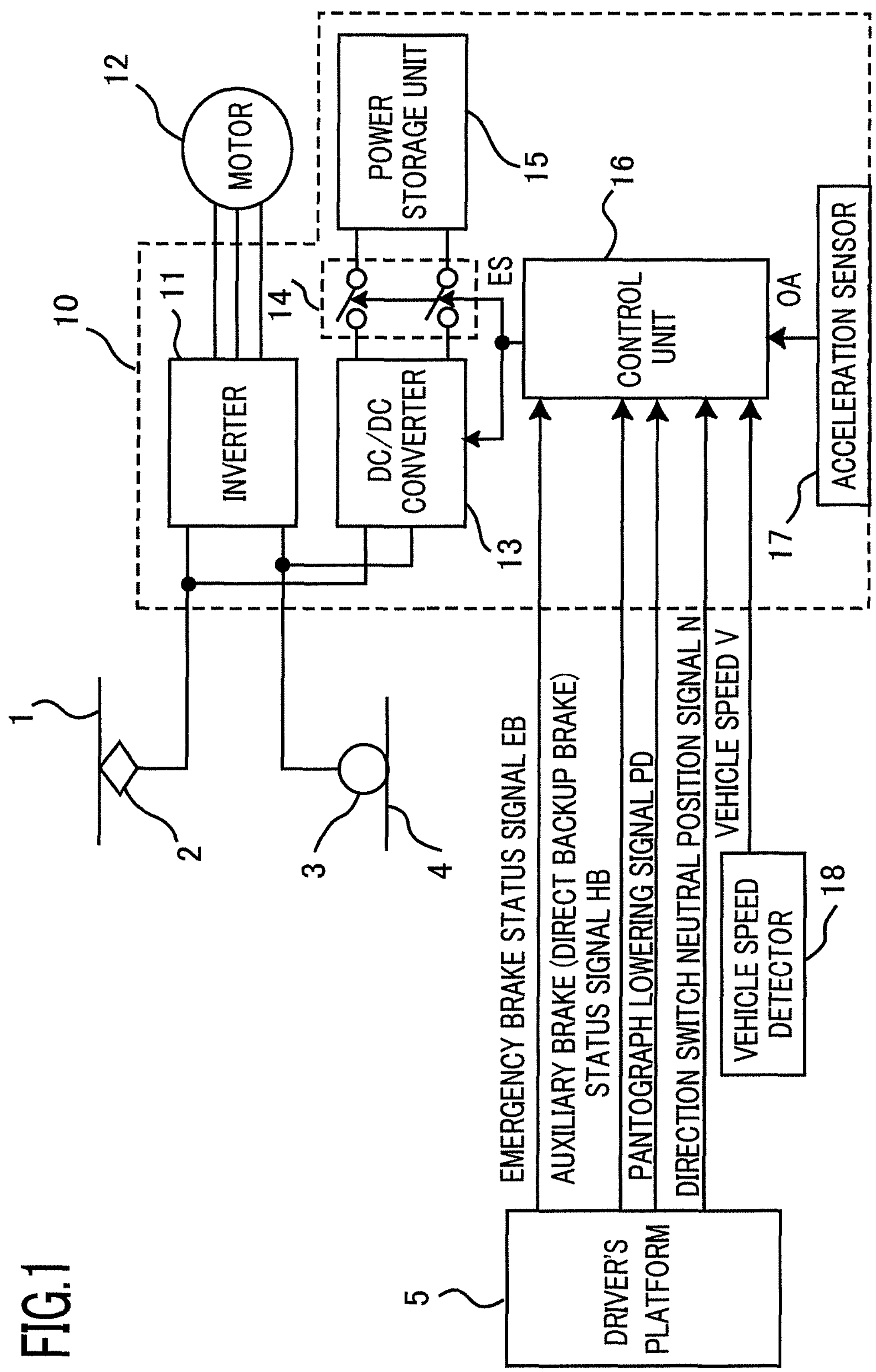
FIG. 1 is a block diagram illustrating an electric-vehicle controller according to Embodiment 1 of the present invention.

FIG. 1 is a block diagram illustrating an electric-vehicle controller according to Embodiment 1 of the present invention. As illustrated in FIG. 1, an electric-vehicle controller 10 is configured in such a way as to receive DC electric power from an overhead line 1 via a pantograph 2 and a wheel 3. The electric-vehicle controller 10 is configured with an inverter 11 that converts DC electric power (e.g., DC 1500 V) from the overhead line 1 into AC electric power (e.g., variable-voltage, variable-frequency electric power) and supplies the AC electric power to a motor 12; a power storage unit 15 that stores electric power for driving the inverter 11; a DC-to-DC converter 13, for making the power storage unit 15 store and discharge electric power, one terminal pair of which is connected to the DC power source side of the inverter 11 and the other terminal pair of which is connected to the power storage unit 15; a switch 14 connected between the power storage unit 15 and the DC-to-DC converter 13; an acceleration sensor 17 that detects acceleration exerted on the electric-vehicle controller 10; and a control unit 16. In addition, it is preferable that, in order to shorten the lead wires provided between the power storage unit 15 and the switch 14, the switch is disposed as close to the power storage unit 15 as possible.

From a driver's platform 5, at least an emergency brake status signal EB, a auxiliary brake (i.e., a direct backup brake) status signal HB, a pantograph lowering signal PD, and a direction switch neutral position signal N are inputted to the control unit 16; furthermore, an acceleration detection value OA from the acceleration sensor 17 and a vehicle speed V from a vehicle speed detector 18 of an electric vehicle are inputted to the control unit 16. As the vehicle speed V of an electric vehicle, a vehicle speed signal estimated based on a rotation speed signal from the motor 12 or an output frequency of the inverter 11 may be utilized. The control unit 16 is configured in such a way as to stop the operation of the DC-to-DC converter 13 in accordance with the foregoing input signals and to output a signal ES so as to make the switch 14 open. When the operation of the DC-to-DC converter 13 is stopped, all switching elements provided in the DC-to-DC converter 13 are turned off.

Depending on the kind of an electric vehicle, signals other than the foregoing input signals may be utilized as the input signals of the control unit 16, or some of the foregoing input signals may not be utilized. In the electric-vehicle controller 10, the input signals are inputted to the control unit 16, and by use of the input signals, the control unit 16 determines whether or not external force has been exerted or may be exerted on the main body.

Here, the emergency brake status signal EB, the auxiliary brake (direct backup brake) status signal HB, the pantograph lowering signal PD, and the direction switch neutral position signal N are status signals from an emergency brake, a auxiliary brake (direct backup brake), a pantograph lowering switch, and a direction switch, respectively, that are provided in the electric vehicle. Each of the status signals will be explained below.

The emergency brake status signal EB is a signal that is inputted to the control unit 16 when a driver or a conductor at the driver's platform 5 puts on the brake or when the emergency brake operates, for example, in accordance with a command from an automatic driving apparatus. In addition, even in normal circumstances, there exists a case in which, when the operation of an electric vehicle is ended, the electric vehicle is stopped and then parked with the emergency brake put on; however, it can be assumed that the case in which the emergency brake is put on while an electric vehicle travels occurs in the case where abnormal circumstances such as a collision and a derailment may take place or have taken place, i.e., in the case where external force or impact has been exerted or may be exerted on the electric-vehicle controller.

The emergency brake is a backup brake, i.e., equipment belonging to a system different from the system to which the emergency brake belongs; the auxiliary brake (direct backup brake) status signal HB is a signal inputted in the case where the auxiliary brake (direct backup brake), provided for stopping the electric vehicle even when the emergency brake does not function, is put on. It can also be assumed that the case in which the auxiliary brake is put on occurs in the case where abnormal circumstances such as a collision and a derailment may take place or have taken place, i.e., in the case where external force or impact has been exerted or may be exerted on the electric-vehicle controller.

The pantograph lowering signal PD is a signal inputted in the case where the pantograph lowering switch is manipulated at the driver's platform 5. In general, the pantograph lowering switch is manipulated to lower the pantograph 2 in the case where the operation of an electric vehicle is ended; it is a switch manipulated only in the case where abnormal circumstances, such as that the driver finds the overhead line 1 ahead of the vehicle disconnected, that the probability of collision between the vehicle and a large obstacle on the rail 4 is recognized, or the like, may take place or have taken place, i.e., in the case where external force or impact has been exerted or may be exerted on the electric-vehicle controller. By lowering the pantograph 2, the damage caused by a short-circuit accident due to intertwining between the overhead line 1 and the pantograph 2 or due to breakage of the electric-vehicle controller can be prevented from being enlarged.

The direction switch neutral position signal N is inputted in the case where a direction switch, which is provided at the driver's platform 5, to be manipulated for setting the traveling direction of the electric vehicle is switched over to the neutral position. Generally, the direction switch has three positions, i.e., the forward position, the neutral position, and the backward position; normally, the neutral position is selected only in the case where the operation of an electric vehicle is ended. When the direction switch is compared to the shift lever of a motor vehicle, the neutral position corresponds to the parking position or the neutral position; the circuit is configured in such a way as to stop the inverter 11 when the neutral position is selected. Accordingly, by selecting the neutral position while the electric vehicle travels, the inverter 11 can be stopped, whereby the supply of electric power to the motor 12 can be interrupted. In normal circumstances, manipulation of this kind is not performed; however, it can be assumed that the case in which the neutral position of the direction switch is selected occurs in the case where abnormal circumstances such as a collision and a derailment may take place or have taken place, i.e., in the case where external force or impact has been exerted or may be exerted on the electric-vehicle controller.

The acceleration sensor 17 is provided in an electric vehicle or the electric-vehicle controller 10; there exists an acceleration sensor that is formed of an element whose electric resistance changes depending on a distortion level in proportion to acceleration and configured in such a way as to be capable of detecting the change in the electric resistance so as to detect the acceleration; however, the configuration thereof is not limited to the foregoing method. The detection value OA, of the acceleration exerted on an electric vehicle or the electric-vehicle controller 10, that is detected in such a manner as described above is inputted to the control unit 16.

Figure 2:
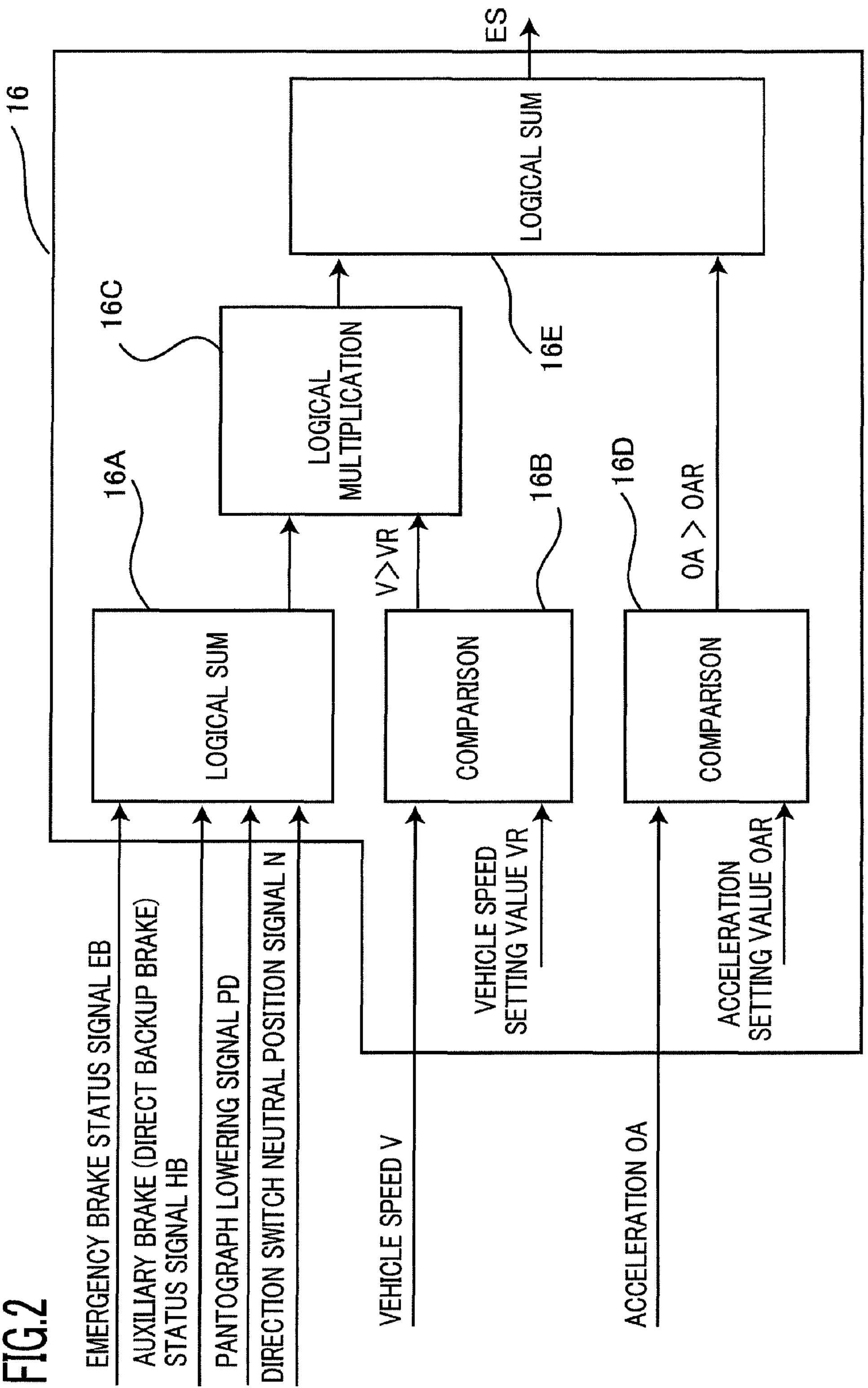
FIG. 2 is a block diagram illustrating a control unit according to Embodiment 1.

The operations of the electric-vehicle controller 10 configured as described above and the control unit 16 thereof will be explained. FIG. 2 is a block diagram illustrating the configuration of the control unit 16 according to Embodiment 1. As illustrated in FIG. 2, the control unit 16 is configured with a logic sum circuit 16A, a comparison circuit 16B, a logic multiplication circuit 16C, a comparison circuit 16D, and a logic sum circuit 16E. In addition, it goes without saying that the circuits 16A through 16E can be configured with software, as long as the functions thereof can be realized.

In the case where any one of the emergency brake status signal EB, the auxiliary brake (direct backup brake) status signal HB, the pantograph lowering signal PD, and the direction switch neutral position signal N is inputted to the logic sum circuit 16A of the control unit 16 and the vehicle speed V is the same as or higher than a predetermined vehicle speed setting value VR (e.g., 10 km/h or higher), the control unit 16 outputs a stop command ES via the logic multiplication circuit 16C and the logic sum circuit 16E so as to immediately stop the operation of the DC-to-DC converter 13, and turns the switch 14 off so as to separate the power storage unit 15 from the DC-to-DC converter 13. Additionally, in the case where the acceleration detection value OA from the acceleration sensor 17 exceeds a predetermined acceleration setting value OAR (e.g., 2 m/sec$^2$, as a value several times as large as the absolute value of a maximal acceleration produced in normal circumstances) that is preliminarily set in order to detect the occurrence of abnormal circumstances, the control unit 16 outputs a stop command ES via the comparison circuit 16D and the logic sum circuit 16E so as to immediately stop the operation of the DC-to-DC converter 13 and to turn the switch 14 off.

The emergency brake status signal EB, the auxiliary brake (direct backup brake) status signal HB, the pantograph lowering signal PD, and the direction switch neutral position signal N are signals that, in normal circumstances, are not inputted while an electric vehicle travels, even though inputted when the electric vehicle is in a stop state. In contrast, in the case where any one of the foregoing signals are inputted while the electric vehicle travels, it is presumed that there have occurred some abnormal circumstances that require an emergency stop and that pose a problem for the travel of the electric vehicle, or it is presumed that abnormal circumstances may occur; thus, it can be determined that excessive external force or impact has been exerted on the electric-vehicle controller 10, or that the excessive external force or impact is likely to be exerted on the electric-vehicle controller 10.

In the case where the absolute value of the acceleration detection value OA from the acceleration sensor 17 becomes the same as or larger than the preliminarily set acceleration setting value OAR, it can be determined that excessive external force or impact has actually been exerted on the electric-vehicle controller 10.

In the case where excessive external force or impact is exerted on the electric-vehicle controller 10, components or lead wires in the electric-vehicle controller 10 are damaged; when a short circuit occurs in connection lead wires or circuits in the vicinity of the power storage unit 15, stored energy is discharged via the short-circuited point, and a great deal of heat or electromagnetic force further damages the electric-vehicle controller 10 or the electric vehicle, whereby the damage is enlarged.

Turning the switch 14 off makes it possible to reduce the possibility of the occurrence of a short circuit in which electric power stored in the power storage unit 15 is discharged. By stopping the operation of the DC-to-DC converter 13, the distal circuits starting from the DC-to-DC converter 13 with respect to the switch 14 are not supplied with electric power; therefore, the safety is enhanced. In addition, as long as the switch 14 is turned off, it is not necessarily required to stop the operation of the DC-to-DC converter 13.

Accordingly, the configuration according to Embodiment 1 can demonstrate an effect that, in the case where excessive external force or impact may be exerted on the electric-vehicle controller 10 or excessive external force or impact has been exerted on the electric-vehicle controller 10, i.e., in the case where abnormal circumstances may occur or abnormal circumstances have occurred, the abnormal circumstances are detected, the operation of the DC-to-DC converter 13 is stopped, and the switch 14 is immediately turned off, so that the discharge of energy stored in the power storage unit 15 can be prevented; thus, the damage can be prevented from being enlarged. Moreover, by configuring the control unit 16 in such a way that it stops the operation of the DC-to-DC converter 13 and turns the switch 14 off only in the case where the vehicle speed V of an electric vehicle is the same as or higher than the vehicle speed setting value VR, the electric-vehicle controller 10 can be prevented from being unnecessarily stopped while an electric vehicle is in a stop state. In addition, by providing a control unit that stops the operation of the DC-to-DC converter and opens the switch so as to separate the power storage unit from the DC-to-DC converter, whether the electric vehicle is in operation or in a stop state, in the case abnormal circumstances may occur or abnormal circumstances have occurred, the electric-vehicle controller can more safely be operated.

Embodiment 2

Figure 3:
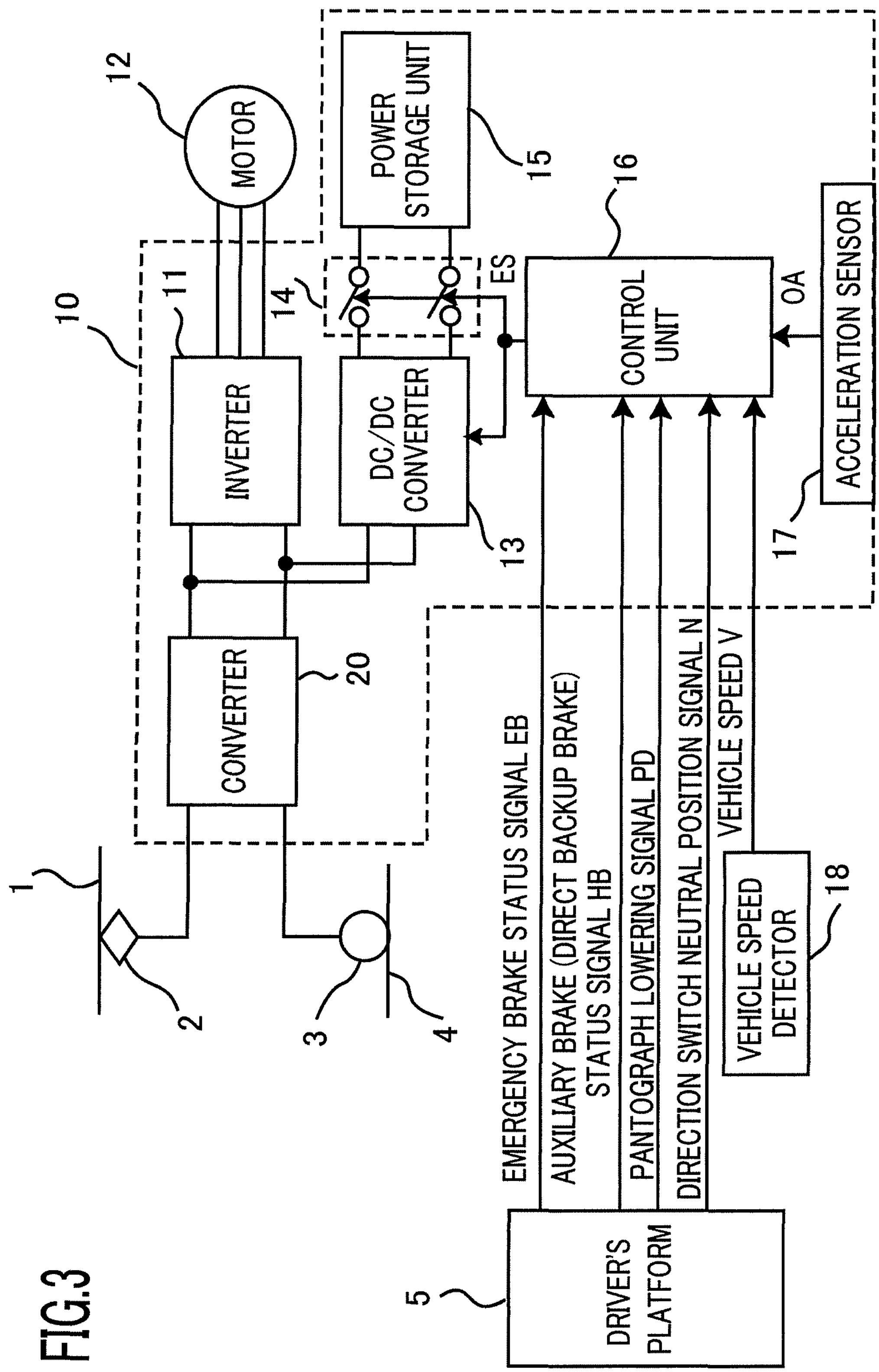
FIG. 3 is a block diagram illustrating an electric-vehicle controller according to Embodiment 2.

FIG. 3 is a block diagram illustrating an electric-vehicle controller according to Embodiment 2. Constituent elements that differ from those in the block diagram illustrated in FIG. 1 will be explained, and explanations for similar constituent elements will be omitted. In addition, the same reference characters in Figures denote the same or equivalent constituent elements. FIG. 3 illustrates an electric-vehicle controller utilized in an AC electrified section in which AC electric power is supplied to the overhead line 1. A converter 20 for converting the AC electric power in the overhead line 1 into DC electric power is connected to the DC side of the inverter 11. It goes without saying that the present invention is applicable also to such an electric-vehicle controller as configured in the foregoing manner.

The configuration according to Embodiment 2 can demonstrate an effect that, in the case where abnormal circumstances in which excessive impact is exerted on the electric-vehicle controller 10 may occur or abnormal circumstances in which excessive impact is exerted on the electric-vehicle controller 10 have occurred, the abnormal circumstances are detected, the DC-to-DC converter 13 and the switch 14 are turned off, so that the discharge of energy stored in the power storage unit 15 can be prevented. As a result, there is obtained an electric-vehicle controller 10 that can prevent the damage from being enlarged. Moreover, by configuring the control unit 16 in such a way that it turns off the DC-to-DC converter 13 and the switch 14 only in the case where the vehicle speed V of an electric vehicle is the same as or higher than the vehicle speed setting value VR, the electric-vehicle controller 10 can be prevented from being unnecessarily stopped while an electric vehicle is in a stop state.

Embodiment 3

Figure 4:
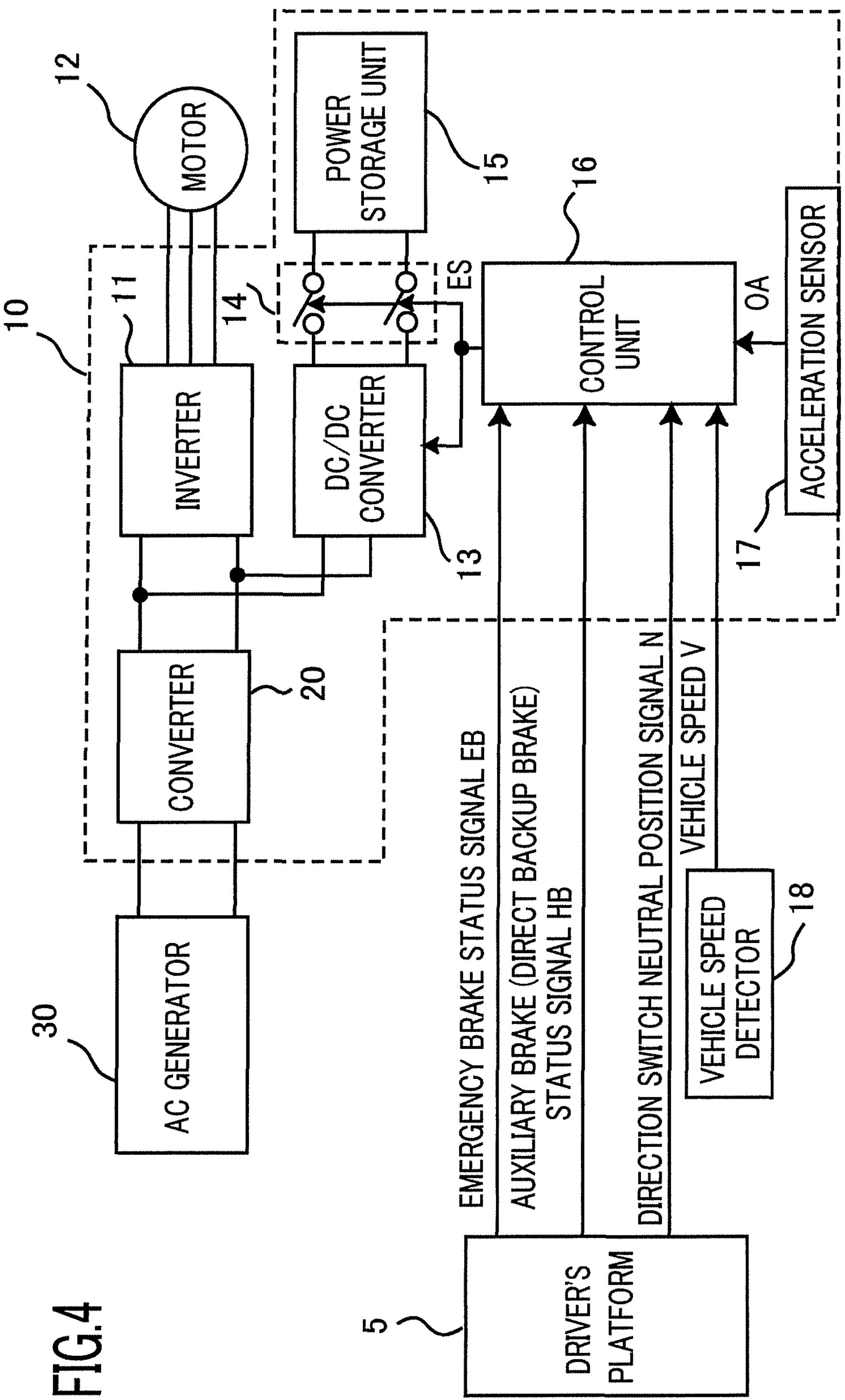
FIG. 4 is a block diagram illustrating an electric-vehicle controller according to Embodiment 3.

FIG. 4 is a block diagram illustrating an electric-vehicle controller according to Embodiment 3. Constituent elements that differ from those in the block diagram illustrated in FIG. 1 will be explained, and explanations for similar constituent elements will be omitted. FIG. 4 illustrates an electric-vehicle controller mounted in a vehicle that travels in a non-electrified section. AC electric power generated by an AC generator 30 that is driven by an internal combustion engine or the like is converted into DC electric power by the converter 20 and supplied to the inverter 11.

It goes without saying that the present invention is applicable also to such an electric-vehicle controller as configured in the foregoing manner. The configuration according to Embodiment 3 can demonstrate an effect that, in the case where abnormal circumstances in which excessive impact is exerted on the electric-vehicle controller 10 may occur or abnormal circumstances in which excessive impact is exerted on the electric-vehicle controller 10 have occurred, the abnormal circumstances are detected, the DC-to-DC converter 13 and the switch 14 are turned off, so that the discharge of energy stored in the power storage unit 15 can be prevented. As a result, there is obtained an electric-vehicle controller 10 that can prevent the damage from being enlarged. Moreover, by configuring the control unit 16 in such a way that it turns off the DC-to-DC converter 13 and the switch 14 only in the case where the vehicle speed V of an electric vehicle is the same as or higher than the vehicle speed setting value VR, the electric-vehicle controller 10 can be prevented from being unnecessarily stopped while an electric vehicle is in a stop state.

Embodiment 4

Figure 5:
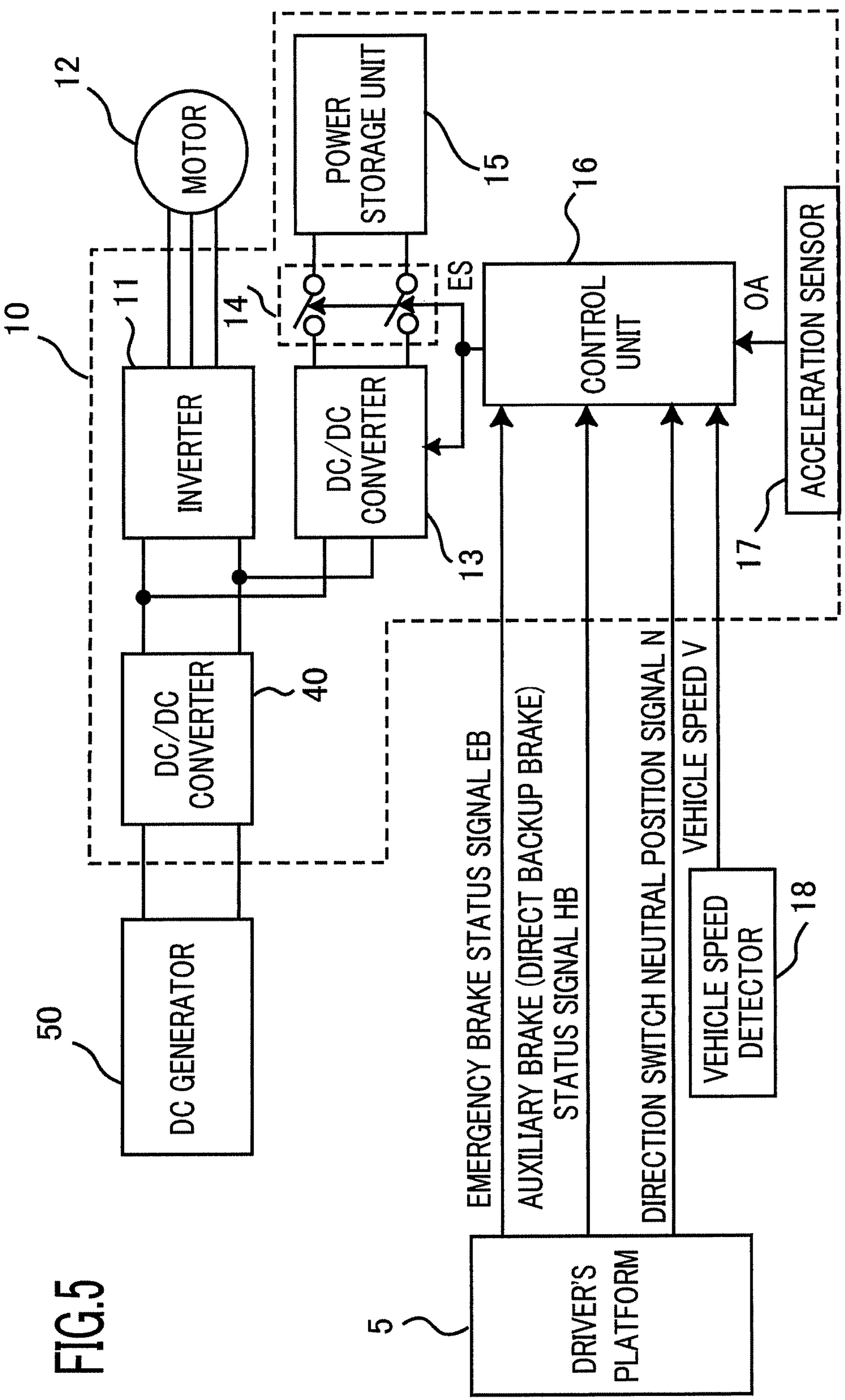
FIG. 5 is a block diagram illustrating an electric-vehicle controller according to Embodiment 4.

FIG. 5 is a block diagram illustrating an electric-vehicle controller according to Embodiment 4. Constituent elements that differ from those in the block diagram illustrated in FIG. 1 will be explained, and explanations for similar constituent elements will be omitted. FIG. 5 illustrates an electric-vehicle controller mounted in a vehicle that travels in a non-electrified section. DC electric power generated by a DC generator 50 formed of a fuel cell, a solar power generator, or the like is converted by a DC-to-DC converter 40 into an optimal DC voltage and supplied to the inverter 11. It goes without saying that the present invention is applicable also to such an electric-vehicle controller as configured in the foregoing manner.

The configuration according to Embodiment 4 can demonstrate an effect that, in the case where abnormal circumstances in which excessive impact is exerted on the electric-vehicle controller 10 may occur or abnormal circumstances in which excessive impact is exerted on the electric-vehicle controller 10 have occurred, the abnormal circumstances are detected, the DC-to-DC converter 13 and the switch 14 are turned off, so that the discharge of energy stored in the power storage unit 15 can be prevented. As a result, there is obtained an electric-vehicle controller 10 that can prevent the damage from being enlarged. Moreover, by configuring the control unit 16 in such a way that it turns off the DC-to-DC converter 13 and the switch 14 only in the case where the vehicle speed V of an electric vehicle is the same as or higher than the vehicle speed setting value VR, the electric-vehicle controller 10 can be prevented from being unnecessarily stopped while an electric vehicle is in a stop state.

In addition, the configurations in the foregoing embodiments are examples of the present invention; the configurations of a plurality of the embodiments may be combined with one another, and it is possible to combine the embodiment with another publicly known technology. It goes without saying that various features of the present invention can be configured, by modifying, for example, partially omitting the foregoing embodiments, without departing from the scope and spirit of the present invention.

Industrial Applicability

Moreover, in the present specification, the present invention has been explained in consideration of application of the present invention to a vehicle; however, the application field of the present invention is not limited thereto, and the present invention is applicable to various mobile bodies, such as a motor vehicle and an elevator, which utilize power storage.

The invention claimed is:

1. An electric-vehicle controller comprising:

an inverter that is connected to a DC power source and drives a motor;

a DC-to-DC converter having first and second terminal pairs, the first terminal pair connected across the DC power source and connected across the inverter;

a power storage unit connected to the second terminal pair of the DC-to-DC converter to receive and store DC electric power;

a switch disposed between the power storage unit and the second terminal pair of DC-to-DC converter;

a vehicle speed detector for detecting a speed of an electric vehicle; and a control unit that is configured to:

(1) receive the speed detected by the vehicle speed detector, (2) determine whether the detected speed is the same as or higher than a predetermined value, and (3) determine whether an emergency brake status signal is present indicating an emergency braking operation for the electric vehicle, wherein the control unit opens the switch so as to separate the power storage unit from the DC-to-DC converter, in response to the emergency brake status signal being present and the detected speed being the same as or higher than the predetermined value.

2. The electric-vehicle controller according to claim 1, wherein, in the case where an abnormal circumstance has occurred or in the case where an abnormal circumstance is anticipated to occur, the control unit opens the switch.

3. The electric-vehicle controller according to claim 1, wherein, when opening the switch, the control unit stops the operation of the DC-to-DC converter.

4. The electric-vehicle controller according to claim 1, wherein the control unit includes:

a logical sum circuit that determines the presence of one of a plurality of external signals including the presence of the emergency brake status signal;

a comparison circuit that determines whether the detected speed is the same as or higher than the predetermined value; and a logical multiplication circuit that outputs a stop command, responsive to the logical sum circuit determining that one of the plurality of external signals is present and the comparison circuit determining that the detected speed is the same as or higher than the predetermined value.

5. The electric-vehicle controller according to claim 1, wherein the control unit is configured to output a stop command signal to control the inverter to immediately turn off responsive to a determination of at least two different conditions being statisfied.

6. An electric-vehicle controller comprising:

an inverter that is connected to a DC power source and drives a motor;

a DC-to-DC converter having first and second terminal pairs, the first terminal pair connected across the DC power source and connected across the inverter;

a power storage unit connected to the second terminal pair of the DC-to-DC converter to receive and store DC electric power;

a switch disposed between the power storage unit and the second terminal pair of the DC-to-DC converter;

a vehicle speed detector for detecting a speed of an electric vehicle; and a control unit that is configured to:

(1) receive the speed detected by the vehicle speed detector, (2) determine whether the detected speed is the same as or higher than a predetermined value, and (3) determine whether an auxiliary brake status signal or a direct backup brake status signal for the electric vehicle is present indicating abnormal operation of the electric vehicle, wherein the control unit opens the switch so as to separate the power storage unit from the DC-to-DC converter, in response to the detected speed being the same as or higher than the predetermined value and one of: (i) the auxiliary brake status signal for the electric vehicle being present or (ii) the direct backup brake status signal for the electric vehicle being present.

7. The electric-vehicle controller according to claim 6, wherein, in the case where an abnormal circumstance has occurred or in the case where an abnormal circumstance is anticipated to occur, the control unit opens the switch.

8. The electric-vehicle controller according to claim 6, wherein, when opening the switch, the control unit stops the operation of the DC-to-DC converter.

9. An electric-vehicle controller comprising:

an inverter that is connected to a DC power source and drives a motor;

a DC-to-DC converter having first and second terminal pairs, the first terminal pair connected across the DC power source and connected across the inverter;

a power storage unit connected to the second terminal pair of the DC-to-DC converter to receive and store DC electric power;

a switch disposed between the power storage unit and the second terminal pair of the DC-to-DC converter;

a vehicle speed detector for detecting a speed of an electric vehicle; and a control unit that is configured to:

(1) receive the speed detected by the vehicle speed detector, (2) determine whether the detected speed is the same as or higher than a predetermined value, and (3) determine whether a pantograph lowering signal is present indicating a pantograph lowering operation of the electric vehicle, wherein the control unit opens the switch so as to separate the power storage unit from the DC-to-DC converter, in response to the detected speed being the same as or higher than the predetermined value and the pantograph lowering signal being present.

10. The electric-vehicle controller according to claim 9, wherein, in the case where an abnormal circumstance has occurred or in the case where an abnormal circumstance is anticipated to occur, the control unit opens the switch.

11. The electric-vehicle controller according to claim 9, wherein, when opening the switch, the control unit stops the operation of the DC-to-DC converter.

12. An electric-vehicle controller comprising:

an inverter that is connected to a DC power source and drives a motor;

a DC-to-DC converter having first and second terminal pairs, the first terminal pair connected across the DC power source and connected across the inverter;

a power storage unit connected to the second terminal pair of the DC-to-DC converter to receive and store DC electric power;

a switch disposed between the power storage unit and the second terminal pair of the DC-to-DC converter;

a vehicle speed detector for detecting a speed of an electric vehicle; and a control unit that is configured to:

(1) receive the speed detected by the vehicle speed detector, (2) determine whether the detected speed is the same as or higher than a predetermined value, and (3) determine whether a neutral position is present indicating that the inverter is stopped, wherein the control unit opens the switch so as to separate the power storage unit from the DC-to-DC converter, in response to the detected speed being the same as or higher than the predetermined value and the neutral position signal being present.

13. The electric-vehicle controller according to claim 12, wherein, in the case where an abnormal circumstance has occurred or in the case where an abnormal circumstance is anticipated to occur, the control unit opens the switch.

14. The electric-vehicle controller according to claim 12, wherein, when opening the switch, the control unit stops the operation of the DC-to-DC converter.

* * * * *